(12) United States Patent
Tehrani

(10) Patent No.: US 11,919,982 B2
(45) Date of Patent: Mar. 5, 2024

(54) LATEXES WITH PHOSPHORIC ACID FUNCTIONAL RESIN PARTICLES

(71) Applicant: Xerox Corporation, Norwalk, CT (US)

(72) Inventor: Sepehr M. Tehrani, North York (CA)

(*) Notice: Subject to any disclaimer, the term of this patent is extended or adjusted under 35 U.S.C. 154(b) by 17 days.

(21) Appl. No.: 17/546,126

(22) Filed: Dec. 9, 2021

(65) Prior Publication Data

US 2023/0183403 A1    Jun. 15, 2023

(51) Int. Cl.
| | |
|---|---|
| C08L 25/14 | (2006.01) |
| C08F 212/08 | (2006.01) |
| C08K 5/521 | (2006.01) |
| C09D 11/106 | (2014.01) |
| C09D 11/322 | (2014.01) |
| C09D 11/38 | (2014.01) |

(52) U.S. Cl.
CPC ............ *C08F 212/08* (2013.01); *C08K 5/521* (2013.01); *C08L 25/14* (2013.01); *C09D 11/106* (2013.01); *C09D 11/322* (2013.01); *C09D 11/38* (2013.01)

(58) Field of Classification Search
CPC ...... C08F 212/08; C09D 11/106; C08L 25/14; C08K 5/521
See application file for complete search history.

(56) References Cited

U.S. PATENT DOCUMENTS

| | | | |
|---|---|---|---|
| 4,923,919 A | | 5/1990 | Frazee |
| 5,461,103 A | | 10/1995 | Bafford et al. |
| 6,433,091 B1 | | 8/2002 | Cheng |
| 8,328,927 B2 | | 12/2012 | Aoyama et al. |
| 8,728,455 B2 | | 5/2014 | Konradi et al. |
| 9,090,736 B2 | | 7/2015 | Schwalm et al. |
| 9,234,110 B2 | | 1/2016 | Katoh et al. |
| 9,359,522 B2 | | 6/2016 | Matsuyama et al. |
| 9,371,464 B2 | | 6/2016 | Breton et al. |
| 9,862,788 B2 | | 1/2018 | Hilf et al. |
| 9,963,592 B2 | | 5/2018 | Burns et al. |
| 10,968,358 B2 | | 4/2021 | Kunii et al. |
| 2006/0038867 A1 | | 2/2006 | Valentini |
| 2008/0186373 A1 | | 8/2008 | Rolly |
| 2011/0012955 A1* | | 1/2011 | Tom ................. B41J 2/015 347/21 |
| 2011/0318551 A1 | | 12/2011 | Nakagawa |
| 2016/0122597 A1 | | 5/2016 | Xiao et al. |
| 2018/0371260 A1 | | 12/2018 | Wu |
| 2019/0367753 A1 | | 12/2019 | Chopra et al. |
| 2021/0222025 A1 | | 7/2021 | Okazaki et al. |
| 2023/0007305 A1* | | 3/2023 | Duquenne .............. C08L 67/04 |
| 2023/0183503 A1 | | 6/2023 | Tehrani et al. |

FOREIGN PATENT DOCUMENTS

| | | | | |
|---|---|---|---|---|
| EP | 1609827 A1 | | 12/2005 | |
| EP | 1108758 B1 | | 7/2006 | |
| EP | 2823002 B1 | | 5/2016 | |
| EP | 2285920 | | 9/2016 | |
| EP | 1756237 B1 | | 5/2017 | |
| EP | 3000853 B1 | | 4/2020 | |
| EP | 3494182 B1 | | 4/2020 | |
| KR | 20160077982 A | * | 7/2016 | ............... C08F 2/24 |
| WO | WO2014/042653 | | 3/2014 | |
| WO | WO2015091318 | | 6/2015 | |
| WO | WO2018/087287 A1 | | 5/2018 | |
| WO | WO2018/143957 | | 8/2018 | |
| WO | WO2018/143959 | | 8/2018 | |
| WO | WO2018/143962 | | 8/2018 | |
| WO | WO2018/158436 A1 | | 9/2018 | |
| WO | WO2021/136721 | * | 10/2021 | ............. B33Y 70/00 |

OTHER PUBLICATIONS

KR20160077982A English Translation (Year: 2016).*
Ink world news of 10.08.2018. Evonik Launches Visiomer Glyfoma, a low-odor reactive diluent (Year: 2018).*
Evonik launches Visiomer® Glyfoma, a low-odor reactive diluent—Evonik PDF press release, available from web as of Jul. 13, 2021 at https://methyl-methacrylate-monomers.evonik.com/en/evonik-launches-visiomer-glyfoma-a-low-odor-reactive-diluent-96754.html.

* cited by examiner

*Primary Examiner* — Wenwen Cai
*Assistant Examiner* — Huihong Qiao
(74) *Attorney, Agent, or Firm* — Bell & Manning, LLC

(57) ABSTRACT

Latex compositions are provided. In embodiments, a latex comprises water and resin particles. The resin particles comprise a polymerization product of reactants comprising one or more types of hydrophobic monomers and one or more types of acidic monomers comprising one or more types of phosphoric acid monomers, wherein a total amount of polymerized acidic monomers in the resin particles is at least about 8 weight % and a total amount of polymerized phosphoric acid monomers in the resin particles is at least about 2 weight %.

3 Claims, No Drawings

LATEXES WITH PHOSPHORIC ACID FUNCTIONAL RESIN PARTICLES

BACKGROUND

Aqueous inkjet ink compositions often include water, water-dispersible colorants, hydrophilic solvents, and binding resins. Binding resins enhance the durability and coating properties of the inks. They are also used to adjust and control the viscosity of the ink to achieve suitable jetting performance. Some binding resins have also been developed to adsorb, attach, or form a coating on the colorants in order to improve the stability and dispersibility of the colorants within the inks.

SUMMARY

The present disclosure provides latexes which may be used to provide resin particles for a variety of compositions such as aqueous inkjet ink compositions. The resin particles are polymerized from hydrophobic monomers and acid monomers, including phosphoric acid monomers. When incorporated into aqueous inkjet ink compositions, the inks exhibit surprisingly high stabilities as evidenced by little to no change in viscosity after long-time storage at elevated temperatures (e.g., 14 days at 60° C.). Aqueous inkjet ink compositions comprising embodiments of the resin particles also exhibit extended open-air stability, facilitating the collection of waste ink from open-air waste trays of aqueous inkjet systems. Embodiments of the resin particles also provide aqueous inkjet ink compositions exhibiting high adhesion to a variety of substrates, including excellent water fastness. These advantages are achieved regardless of the type of colorant being used and even without the resin particles being adsorbed, attached, or coated onto the colorant. Finally, embodiments of the resin particles provide "universal" aqueous inkjet ink compositions that are able to form high quality printed images on a broad range of paper and non-paper, e.g., metal substrates.

Latex compositions are provided. In embodiments, a latex comprises water and resin particles. The resin particles comprise a polymerization product of reactants comprising one or more types of hydrophobic monomers and one or more types of acidic monomers comprising one or more types of phosphoric acid monomers, wherein a total amount of polymerized acidic monomers in the resin particles is at least about 8 weight % and a total amount of polymerized phosphoric acid monomers in the resin particles is at least about 2 weight %.

Other principal features and advantages of the disclosure will become apparent to those skilled in the art upon review of the following drawings, the detailed description, and the appended claims.

DETAILED DESCRIPTION

Latex

In one aspect, latexes are provided. Such a latex comprises resin particles synthesized from various monomers, forming a polymeric material from which the resin particles are composed. Hydrophobic monomers are used to form the resin particles. Various hydrophobic monomers may be used such as styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; β-carboxy ethyl acrylate (β-CEA), phenyl acrylate, methyl alphachloroacrylate; butadiene; isoprene; methacrylonitrile; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. (The use of "(meth)" as in, e.g., "(meth)acrylic acid", refers to both acrylic acid and methacrylic acid.) A single type or combinations of different types of hydrophobic monomers may be used. The phrase "single type" refers to same chemical compounds whereas the phrase "different types" refers to different chemical compounds. For example, styrene is a single type of hydrophobic monomer while styrene and alkyl (meth)acrylates are different types of hydrophobic monomers. Methyl (meth)acrylate is a single type of hydrophobic monomer (specifically, a single type of alkyl (meth)acrylate) while methyl (meth)acrylate and ethyl (meth)acrylate are different types of hydrophobic monomers (specifically, different types of alkyl (meth)acrylates). Thus, the phrase "one or more types" encompasses both monomers of a single type and monomers of different types.

In embodiments, the hydrophobic monomers used to form the resin particles comprise styrene, an alkyl (meth)acrylate (e.g., methyl (meth)acrylate, ethyl (meth)acrylate, butyl (meth)acrylate, or combinations thereof), or both. Thus, the alkyl group of the alkyl (meth)acrylates may have 1 or more carbons, 2 or more carbons, 4 or more carbons, or from 1 to 6 carbons.

In embodiments, certain hydrophobic monomers are not used to form the resin particles, including 4-methylstyrene, cyclohexyl acrylate, isobornyl methacrylate, isobornyl acrylate, or combinations thereof.

Acidic monomers are also used to form the resin particles, including phosphoric acid monomers. The phosphoric acid monomers are polymerizable monomers that have a polymerizable moiety (e.g., a carbon-carbon double bond) as well as a $P(O)(OR)_3$ moiety. The polymerizable moiety may be provided by the R group. In the $P(O)(OR)_3$ moiety, each R may be independently selected from a hydrogen and an organic group, wherein at least one R is the organic group. The term "phosphoric acid" is used since the $P(O)(OR)_3$ moiety is closely related to phosphoric acid, $P(O)(OH)_3$, having three hydroxyl groups. The phosphoric acid monomer used may have 1, 2, or 3 such organic groups, which may be the same or different. Salts of the phosphoric acid monomer are also encompassed, i.e., in which the hydrogen of an OH group is replaced by a cation. The $P(O)(OR)_3$ moiety is distinguished from a phosphonic acid moieties having formula $P(O)(OR)_2R$.

In embodiments, the organic group is an alkyl (meth)acrylate. In embodiments, the alkyl group of the alkyl (meth)acrylate has at least 2 carbons, at least 3 carbons, at least 4 carbons, at least 5 carbons, or from 1 to 6 carbons. In embodiments, at least one R is ethyl (meth)acrylate. In embodiments, the phosphoric acid monomer has 1, 2, or 3 ethyl (meth)acrylate groups. Illustrative phosphoric acid monomers include phosphoric acid 2-hydroxyethyl methacrylate ester and bis[2-(methacryloyloxy)ethyl] phosphate.

In embodiments, the organic group has Formula I

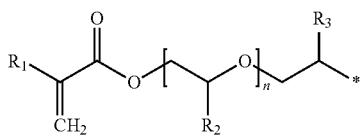

wherein $R_{1-3}$ are independently selected from hydrogen and methyl; n is from 0 to 20, including any number between 0 and 20; and "*" denotes the bond to an oxygen of the $P(O)(OR)_3$ moiety. In embodiments, n is 0, $R_1$ is hydrogen or methyl, and $R_3$ is hydrogen. One, two, or three such organic groups may be present.

In embodiments, the phosphoric acid monomer is based on poly(ethylene glycol) wherein in Formula I, $R_1$ is hydrogen or methyl, $R_2$ is hydrogen, $R_3$ is hydrogen and n is from 0 to 20. In embodiments, n is from 1 to 20. This includes from 2 to 16 and from 4 to 12. Although one, two, or three such organic groups may be present. In embodiments, one such organic group is present to provide a phosphate ester of poly(ethylene glycol) mono(meth)acrylate (i.e., the other R groups are hydrogen).

In embodiments, the phosphoric acid monomer is based on poly(propylene glycol) wherein in Formula I, $R_1$ is hydrogen or methyl, $R_2$ is methyl, $R_3$ is methyl and n is from 0 to 20. In embodiments, n is from 1 to 20. This includes from 2 to 16 and from 4 to 12. Although one, two, or three such organic groups may be present. In embodiments, one such organic group is present to provide a phosphate ester of poly(propylene glycol) mono(meth)acrylate (i.e., the other R groups are hydrogen).

Although other organic groups may be used, in embodiments, the organic group is not vinyl (i.e., $CH_2CH_2$).

A single type or combinations of different types of phosphoric acid monomers may be used. (The meaning of "single type," "different types," and "one or more types" is analogous to that described above for hydrophobic monomers.)

In addition to the phosphoric acid monomers, other acidic monomers may be used to form the resin particles. These other acidic monomers refer to those of a different type, i.e., a different chemical compound, as compared to the selected phosphoric acid monomers and which do not have the $P(O)(OR)_3$ moiety described above. Thus, these other acidic monomers may be referred to as "additional acidic monomers." The additional acidic monomers which may be used include (meth)acrylic acid monomers, sulfonic acid monomers, sulfonate monomers, and combinations thereof. Illustrative acidic monomers include acrylic acid, methacrylic acid, ethacrylic acid, dimethylacrylic acid, maleic anhydride, maleic acid, styrenesulfonic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, vinyl benzoic acid, 2-acrylamido-2-methyl-1-propane-sulfonic acid, and combinations thereof. As with the phosphoric acid monomers, these additional acidic monomers also encompass salts thereof. Similarly, a single type or combinations of different types of additional acidic monomers may be used. (The meaning of "single type," "different types," and "one or more types" is analogous to that described above for hydrophobic monomers.)

In embodiments, additional acidic monomers are used along with the phosphoric acid monomers. In embodiments, the additional acidic monomers comprise (meth)acrylic acid, β-CEA, or both. As further described below, the use of additional acidic monomer (along with the phosphoric acid monomers) and in the amounts described below is useful to improve the stability of aqueous inkjet ink compositions formed from the disclosed latexes.

A variety of other monomers may be used to form the resin particles. For example, a monomer which is an ester of (meth)acrylic acid with an alcohol comprising a dioxane moiety or an alcohol comprising a dioxolane moiety may be used. In the present disclosure, this type of monomer may be referred to as an "dioxane/dioxolane monomer." This phrase, dioxane/dioxolane monomer, encompasses the monomer which is the ester of (meth)acrylic acid with the alcohol comprising the dioxane moiety, the monomer which is the ester of (meth)acrylic acid with the alcohol comprising the dioxolane moiety, and both such monomers. The dioxane moiety may be a 1,3-dioxane moiety and the dioxolane moiety may be a 1,3-dioxolane moiety. The alcohol comprising the dioxane/dioxolane moiety may be an acetal of a triol, a ketal of a triol, or a carbonate of a triol. Illustrative triols include glycerol and trimethylolpropane. The triol may be unsubstituted or substituted. By "substituted" it is meant that one or more bonds to a carbon(s) or hydrogen(s) are replaced by a bond to non-hydrogen and non-carbon atoms. The dioxane/dioxolane monomer may have Formula II (dioxane) or III (dioxolane) as shown below, wherein R is selected from hydrogen and methyl; R' is selected from hydrogen and ethyl; and Z is selected from hydrogen, an oxygen of a carbonyl group, an alkyl group, an aryl group, and an alkoxy group. Either or both types of monomers may be used in the resin particles.

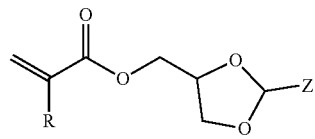

Formula II

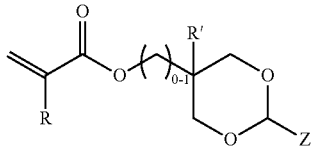

Formula III

The carbonyl group refers to a C=O group, that is Z is O covalently bound to the carbon via a double bond, thereby forming a carbonyl group between the two oxygens of the 5 or 6-membered ring. The alkyl group may be linear or branched. The alkyl group may have from 1 to 20 carbons. This includes having from 1 to 18 carbons and from 1 to 10 carbons, e.g., 1, 2, 3, 4, 5, 6, 7, 8, 9, or 10 carbons. The alkyl group may be substituted or unsubstituted. The aryl group may be monocyclic having one aromatic ring, e.g., benzene, or polycyclic having one or more fused rings. The aryl group may be unsubstituted or substituted as described above with respect to the alkyl group, although substituted aryl groups also encompass aryl groups in which a bond to a hydrogen(s) is replaced by a bond to an unsubstituted or substituted alkyl group as described above. The alkoxy group refers to an —O-alkyl group.

Illustrative dioxane/dioxolane monomers include glycerol formal (meth)acrylate, trimethylolpropane formal (meth)acrylate, and isopropylideneglycerol (meth)acrylate. A single type or combinations of different types of dioxane/dioxolane monomers may be used. In embodiments, however, the dioxane/dioxolane monomer is glycerol formal (meth)acrylate. Glycerol formal (meth)acrylate has a relatively high $T_g$ (about 85-90° C.). In the present disclosure, the name "glycerol formal (meth)acrylate" (as well as the names of the other dioxane/dioxolane monomers described in this paragraph) refers to either the dioxane isomer, the dioxolane isomer, or both. That is, all possibilities are encompassed by the names.

Although not necessary, in some embodiments, multifunctional monomers, i.e., those comprising more than one polymerizable group (e.g., 2, 3, 4), may be used to form the resin particles. (The term "multifunctional monomer" is a term distinguished from a phosphoric acid monomers that may contain more than one polymerizable group.) Multifunctional monomers are useful as they facilitate crosslinking within the resin particles. Illustrative multifunctional monomers include difunctional monomers such as a poly(ethylene glycol) di(meth)acrylate, e.g., poly(ethylene glycol) diacrylate having a molecular weight of 250 g/mol. Other poly(ethylene glycol) di(meth)acrylates may be used, including those having a molecular weight in a range of from 214 g/mol to 1000 g/mol, from 214 g/mol to 500 g/mol, and from 214 g/mol to 300 g/mol. These molecular weight values may be determined using gel permeation chromatography. Other difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene(2)-2,2-bis(4-hydroxyphenyl)propane diacrylate, polyoxyethylene(4)-2,2-bis(4-hydroxyphenyl)propane diacrylate, and compounds obtained by substituting acrylate of these compounds with methacrylate. Other difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

In embodiments, however, the monomers which are used to form the resin particles do not include multifunctional monomers, e.g., polyfunctional acrylates. Similarly, in embodiments, crosslinking agents, e.g., epoxide containing compounds, are not used to form the resin particles.

Reactive surfactants may be used to form the resin particles. Suitable reactive surfactants comprise a polymerizable (and thus, reactive) group such that they become incorporated into the resin particles. Illustrative reactive surfactants include anionic ether sulfate reactive surfactants such as those in the commercially available Hitenol series such as Hitenol AR10-25. Other suitable reactive surfactants include polyoxyethylene alkylphenyl ether ammonium sulfate, Hitenol BC-10, BC-20, BC10-25, BC-2020, BC-30; polyoxyethylene styrenated phenyl ether ammonium sulfate including Hitenol AR-10, AR-20, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the resin particles. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In embodiments, other certain monomers are excluded in forming the resin particles. Monomers which may be excluded are unsaturated ethylene monomers having an alkyl group having from 12 to 22 carbons.

In forming the latex comprising the resin particles, various combinations of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles/latex, including to achieve the values of the properties described below. Illustrative amounts are provided below.

The total amount of hydrophobic monomers used in the monomer emulsion may be in a range from 70 weight % to 97 weight %, from 75 weight % to 90 weight %, or from 80 weight % to 90 weight %. (Here, weight % refers to the (total weight of hydrophobic monomers)/(total weight of monomers in the monomer emulsion, excluding the reactive surfactants)*100). When present, the alkyl (meth)acrylate (e.g., methyl (meth)acrylate, ethyl (meth)acrylate), butyl (meth)acrylate) may be present at an amount of at least 15 weight %, at least 20 weight %, at least 25 weight %, or in a range of from 15 weight % to 30 weight %. (Weight % has a meaning analogous to that described for hydrophobic monomers.)

The total amount of acidic monomers used in the monomer emulsion may be at least 8 weight %, at least 10 weight %, or at least 15 weight %. In embodiments, the total amount of acidic monomers is less than 15 weight % or less than 10 weight %. These ranges encompass amounts from 8 weight % to 25 weight %, from 8 weight % to 20 weight %, from 10 weight % to 18 weight %, and from 10 weight % to 16 weight %. (Weight % has a meaning analogous to that described for hydrophobic monomers.) The total amount of phosphoric acid monomers used in the monomer emulsion may be at least 2 weight %, at least 3 weight %, or at least 4 weight %. In embodiments, the total amount of phosphoric acid monomers is less than 10 weight % or less than 8 weight %. These ranges encompass amount from 2 weight % to 10 weight %, from 2 weight % to 8 weight %, and from 2 weight % to 6 weight %. (Weight % has a meaning analogous to that described for hydrophobic monomers.) As noted above, in embodiments, an additional acidic monomer is used in addition to the phosphoric acid monomer. In such embodiments, a weight ratio of the total amount of the phosphoric acid monomers to the total amount of the additional acidic monomers is 1.0 or less, less than 0.9, less than 0.8, less than 0.7, less than 0.6, less than 0.5, less than 0.4, or in a ratio of from 0.3 to 1.0, 0.3 to 0.8, or 0.3 to 0.5.

If a dioxane/dioxolane monomer is used in the monomer emulsion, the total amount of dioxane/dioxolane monomers may be in a range of from 1 weight % to 40 weight %, 1 weight % to 30 weight %, 1 weight % to 20 weight %, from 1 weight % to 10 weight %, and from 1 weight % to 5 weight %. (Weight % has a meaning analogous to that described for hydrophobic monomers.)

If a multifunctional monomer is used in the monomer emulsion, the total amount of multifunctional monomers may be in a range of from 0.001 weight % to 1 weight %, from 0.001 weight % to 0.8 weight %, and from 0.01 weight % to 0.6 weight %. (Weight % has a meaning analogous to that described for hydrophobic.)

If a reactive surfactant is used in the monomer emulsion, the total amount of reactive surfactant may be in a range of from 0.1 weight % to 6.5 weight %. (Here, weight % refers to the (total weight of reactive surfactants)/(total weight of monomers in the monomer emulsion, including the reactive surfactant monomers)*100). This range includes from 0.3 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent, hydrophobic monomers and acidic monomers, including phosphoric acid monomers. In embodiments, the hydrophobic monomers comprise styrene and an alkyl (meth)acrylate, e.g., butyl acrylate. In embodiments, the phosphoric acid monomers comprise those having formula $P(O)(OR)_3$, wherein each R is independently selected from a hydrogen and an organic group, wherein at least one R is the organic group. In embodiments, the organic group is an alkyl (meth)acrylate. In embodiments, the organic group has Formula I. In embodiments, the phosphoric acid monomers comprise phosphoric acid 2-hydroxyethyl methacrylate ester, bis[2-(methacryloyloxy) ethyl] phosphate, or a combination thereof. In embodiments, the phosphoric acid monomers comprise a phosphate ester of polyethylene glycol mono(meth)acrylate, a phosphate ester of polypropylene glycol mono(meth)acrylate, or a combination thereof. In any of these embodiments, an additional acidic monomer may be used, e.g., methacrylic acid. In any of these embodiments, a dioxane/dioxolane monomer may be used (e.g., glycerol formal methacrylate). In any of these embodiments, a multifunctional monomer may be used (although in some embodiments, no multifunctional monomer is used). In any of these embodiments, a reactive surfactant (e.g., an anionic ether sulfate) may be used. In any of these embodiments, a chain transfer agent may be used. In any of these embodiments, amounts of the various monomers, reactive surfactants, and chain transfer agents may be used as described above. The balance may be made up of the solvent.

In embodiments, the monomer emulsion is free of (i.e., does not comprise) a surfactant. However, in other embodiments, a surfactant may be used. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and block copolymer of polyethylene oxide and polypropylene oxide.

In embodiments, the monomer emulsion is free of (i.e., does not comprise) silica particles. Commercially available silica particles which may be excluded are the following: various grades of LUDOX Colloidal Silica such as FM, SM, HS-30, HS-40, LS, TM-40, TM-50, SM-AS, AS-30, AS-40, AM, HSA, TMA, P X-30, P t-40, P W-50, CL, and CL-P; and various grades of Nissan Chemical Silica such as SNOW-TEX ST-20L, ST-30, ST-40, ST-50, ST-OS, ST-O, ST-O-40, ST-OL, ST-C, ST-C-30, ST-CM, ST-N, STN30G, ST-N40, ST-NS, ST-XS, ST-S, ST-UP, ST-O-UP, MA-ST-UP, ST-PS-S, AMT-330S, HX-305M1, and HX-305M5.

Various polymerization techniques may be used to form the resin particles such as monomer-starved emulsion polymerization, conventional emulsion polymerization, suspension polymerization, mini-emulsion polymerization, nano-emulsion polymerization, seeded-emulsion polymerization, and microemulsion polymerization. These polymerization techniques may make use of any of the monomer emulsions described above. An illustrative monomer-starved emulsion polymerization process is described below. It is noted, however, that the polymerization technique used provides the polymerized polymer in the form of particles which are insoluble in aqueous media. This is by contrast to polymerization techniques, e.g., solution polymerization, including those described in U.S. Pat. No. 9,963,592, which provide solubilized polymers in organic media.

An illustrative method of making a latex comprising the resin particles comprises adding any of the monomer emulsions described above to a reactive surfactant solution at a feed rate over a period of time. The reactive surfactant solution comprises a solvent and a reactive surfactant. Any of the solvents and any of the reactive surfactants described above may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 0.1 to 10 weight % and from 0.5 weight % to 5 weight %. (Here, weight % refers to the (total weight of reactive surfactants)/(total weight of reactive surfactant solution)*100.) The buffer may be used in an amount in a range of from 0.25 weight % to 2.5 weight %. (Weight % has a meaning analogous to that described above.)

An initiator may be included in the reactive surfactant solution. Alternatively, a separate initiator solution comprising the initiator and any of the solvents described above may be formed and the separate initiator solution added to the reactive surfactant solution. The separate initiator solution may be added prior to the addition of the monomer emulsion. An additional amount of a separate initiator solution may be added after the addition of the monomer emulsion. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2-methyl-N-(phenylmethyl)propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochlo-ride, 2,2'-azobis[2-(5-hydroxy-3,4,5,6-tetrahydropyrimidin-2-yl)propane]di-hydrochloride, 2,2'-azobis {2-[1-(2-hydroxyethyl)-2-imidazolin-2-yl]propane} dihydrochloride, and combinations thereof. The initiator may be used in an amount in a range of from 0.05 weight % to 2.5 weight %. (Here, weight % refers to the (total weight of initiators)/ (total weight of reactive surfactant solution)*100.)

In embodiments, the reactive surfactant solution comprises (or consists of) a solvent (e.g., water), a reactive surfactant, and optionally, one or more of an initiator and a buffer. In any of these embodiments, amounts of the reactive surfactants, initiator, and buffer may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any of the silica particles described above. As a result, the resin particles may be characterized as being free of (i.e., not comprising) any of the surfactants and/or any of the silica particles described above. In at least some embodiments, the reactive surfactant solution is free of (i.e., does not comprise) any monomers, other than the reactive surfactant monomer(s) present in the solution.

The addition of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the monomer emulsion and continuing during the addition of the monomer emulsion.

As noted above, the monomer emulsion is added at a feed rate over a period of time. In the presence of the initiator, the monomers of the monomer emulsion undergo polymerization reactions to form the resin particles of the latex. The feed rate is sufficiently slow so that the polymerization is carried out under "monomer-starved" conditions. This means that the feed rate is no greater than the rate the polymerization reactions, e.g., between styrene and acrylate monomers. Illustrative feed rates include those in a range of from 1 mL/min to 10 mL/min based on a total reaction volume of 1 L. Illustrative periods of time include those in a range of from 60 minutes to 600 minutes. After the monomer emulsion has been added, the polymerization may be allowed to continue for an additional period of time, with or without the addition of additional initiator. Illustrative additional periods of time include those in a range of from 1 hour to 18 hours. Both the addition of the monomer emulsion and the polymerization after addition may be carried out under the inert gas and at the elevated temperature. Optionally, the latex formed may be processed by standard techniques such as coagulation, dissolution and precipitation, filtering, washing, or drying. The processed or unprocessed latex may be used to form the aqueous inkjet ink compositions described below.

The monomer-starved emulsion polymerization process described above does not involve the use of a resin seed in forming the resin particles. However, as noted above, seeded-emulsion polymerization techniques may be used.

The methods may further comprise forming the monomer emulsion, forming the reactive surfactant solution, and/or forming the initiator solution. Each may be formed by combining the desired components at the desired amounts and mixing.

The composition of the resin particles depends upon the selection of the monomers and their relative amounts, as well as the polymerization reactions between selected monomers that produce a polymerization product as described above. Thus, a variety of compositions are encompassed, including those based on various polymerization products of reactants comprising various combinations of monomers. As noted above, the reactants include hydrophobic monomers and acidic monomers including phosphoric acid monomers, but otherwise, the selection of other monomers is not particularly limited. For clarity, the composition of the resin particles may be identified by reference to the monomers which are polymerized, recognizing that the chemical form of those monomers is generally altered as a result of the polymerization reactions. Once polymerized in the resin particles, monomers may be referred to as "polymerized monomers."

In embodiments, the resin particles comprise (or consist of) the polymerization product (e.g., copolymer) of reactants comprising hydrophobic monomers and acidic monomers, including phosphoric acid monomers. In embodiments, the hydrophobic monomers comprise styrene and an alkyl (meth)acrylate, e.g., butyl acrylate. In embodiments, the phosphoric acid monomers comprise those having formula $P(O)(OR)_3$, wherein each R is independently selected from a hydrogen and an organic group, wherein at least one R is the organic group. In embodiments, the organic group is an alkyl (meth)acrylate. In embodiments, the organic group has Formula I. In embodiments, the phosphoric acid monomers comprise phosphoric acid 2-hydroxyethyl methacrylate ester, bis[2-(methacryloyloxy)ethyl] phosphate, or a combination thereof. In embodiments, the phosphoric acid monomers comprise a phosphate ester of polyethylene glycol mono(meth)acrylate, a phosphate ester of polypropylene glycol mono(meth)acrylate, or a combination thereof. In any of these embodiments, an additional acidic monomer may be used, e.g., methacrylic acid. In any of these embodiments, a dioxane/dioxolane monomer may be used (e.g., glycerol formal methacrylate). In any of these embodiments, a multifunctional monomer may be used (although in some embodiments, no multifunctional monomer is used). In any of these embodiments, a reactive surfactant (e.g., an anionic ether sulfate) may be used. In each of these embodiments, an initiator (or a portion thereof) may be incorporated at an end of each polymer chain in the resin particles. In each of these embodiments, the resin particles may be crosslinked. In each of these embodiments, the polymerized monomers may be present in the resin particles in the amounts described above with respect to the amounts of monomers in the monomer emulsion. This is because experiments have shown that the conversion of the monomers during the polymerization reactions is above 99.9%. For example, the total amount of polymerized acidic monomers in the resin particles may be in a range of from 8 weight % to 25 weight %. Analogous to the definition of weight % provided above, when referring to the resin particles, the term weight % refers to (total weight of polymerized acidic monomers)/(total weight of polymerized monomers, excluding polymerized reactive surfactants)*100).

Using a specific, illustrative composition, the composition of the resin particles may also be identified as poly[(styrene)-ran-(butyl acrylate)-ran-(phosphoric acid 2-hydroxyethyl methacrylate ester)-ran-(methacrylic acid)-ran-(anionic ether sulfate)]. In this description, the different chemical moieties which result from the polymerization reactions is identified by reference to the corresponding monomer in its parenthesis and "ran" refers to the random incorporation of the different monomers into the copolymer. The use of this description encompasses the presence of an initiator (or portion thereof) at the beginning of each copolymer as well as crosslinking (if used).

In embodiments in which certain monomers (or other reactants) are excluded from forming the resin particles, it follows that such monomers (or other reactants) do not participate in the polymerization reactions to form the polymeric matrix of the resin particles. Thus, in these embodiments, the composition of the resin particles may be described as being free of (i.e., not comprising) one or more of 4-methylstyrene, cyclohexyl acrylate, isobornyl methacrylate, isobornyl acrylate, and an unsaturated ethylene monomer having an alkyl group having from 12 to 22 carbons.

In embodiments, the latex may be described as being free of (i.e., not comprising) a resin/polymer other than what is provided by the resin of the present resin particles themselves.

Since the resin/polymer making up the resin particles has already been polymerized, the latex itself is generally not curable and as such, is free of (i.e., does not comprise) an initiator. This does not preclude the presence of a minor amount of unreacted initiator or reacted initiator which may be incorporated into polymer chains. Similarly, the latex may be described as being free of (i.e., not comprising) monomers.

In embodiments, the latex may also be described as being free of (i.e., not comprising) components such as a boric acid, diglycolic acid, a chelating agent (e.g., ethylenediaminetetraacetic acid (EDTA)), or combinations thereof. In this embodiment, exclusion of a chelating agent does not refer to excluding the phosphoric acid monomer (which is polymerized into the resin particles).

The latex itself may also distinguished from the aqueous inkjet ink compositions described herein (and similar compositions) by not comprising a colorant (including any of the colorants described below).

The water content of the latexes may be at least 40 weight %. This includes at least 50 weight % and at least 60 weight %. These weight % refer to the weight of water as compared to the total weight of the latex.

The resin particles may be characterized by their size. The size of the particles may be reported as a $D_{50}$ particle size, which refers to a diameter at which 50% of the sample (on a volume basis) is comprised of particles having a diameter less than said diameter value. The $D_{50}$ particle size may be measured using a Malvern Zetasizer Nano ZS. For check of light scattering techniques and methods, NIST polystyrene Nanosphere control samples having a diameter within the range of 20 nm to 200 nm available from Microspheres-Nanospheres (a Corpuscular company of Microtrac) or third-party vendors (such as ThermoFisher Scientific) may be used. In embodiments, the resin particles are characterized by a $D_{50}$ particle size of from 50 nm to 120 nm. This includes from 60 nm to 110 nm, and from 70 nm to 100 nm.

Latexes comprising the present resin particles may be characterized by their viscosities. The viscosity values may refer to a particular temperature and a particular solids content and may be measured using a Tuning fork vibration viscometer (Cole-Parmer). In embodiments, the viscosity at room temperature and a solids content of 40% is in a range of from 40 cp to 600 cp. This includes from 65 cp to 575 cp, 90 cp to 550 cp, and from 115 cp to 525 cp. These viscosities are all initial viscosities, measured within a day of forming the latex.

The present resin particles may also be characterized by their $T_g$ values. The $T_g$ values may be measured using a Differential Scanning Calorimetry (DSC) TA Instruments Discovery DSC 2500. In embodiments, the $T_g$ is in a range of from 40° C. to 100° C. This includes from 50° C. to 90° C., and from 60° C. to 80° C.

Aqueous Inkjet Ink Compositions

Any of the resin particles/latexes described above may be used to provide an aqueous inkjet ink composition. By "aqueous inkjet ink composition," it is meant that the composition is configured for use in, and is capable of being used in, an inkjet printing apparatus to form printed images, as further described below. Resin particles may be present in the aqueous inkjet ink composition in an amount in a range of from 1 weight % to 10 weight % and from 5 weight % to 10 weight %. (Here, weight % refers to the (total weight of resin particles)/(total weight of aqueous inkjet ink composition)*100.) This range includes from 5 weight % to 10 weight %. A variety of other components may be used to form the aqueous inkjet ink compositions as described below.

Solvent System

The aqueous inkjet ink compositions comprise a solvent system based on water. The solvent system can consist solely of water, or can comprise a mixture of water and a water-soluble and/or water-miscible organic solvent. The water-soluble and water-miscible organic solvents may be referred to herein as a co-solvent or a humectant. Suitable such organic solvents include alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol. Illustrative examples include ethylene glycol, propylene glycol, diethylene glycols, hexyl glycol, glycerine, dipropylene glycols, trimethylolpropane, 1,2-hexanediol, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,3-butanediol, 1,4-butanediol, and 2,4-heptanediol. Other suitable solvents include amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, and substituted and unsubstituted acetamides. Combinations of these organic solvents may be used.

Suitable water-soluble and/or water-miscible organic solvents include a glycol of hydrocarbons having a carbon number of 4 to 7. Examples of such a glycol include 1,2-pentanediol; 1,2-hexanediol; 1,5-pentanediol; 1,6-hexanediol; 3-methyl-1,3-butanediol; 1,2-butanediol; 2,4-pentanediol; 1,7-heptanediol; 3-methyl-1,5-pentanediol; trimethylolpropane; ethyleneurea; 1,2,6-hexantriol; 1,2,3-butanetriol; sorbitol; diethylene glycol; 1,2,4-butanetriol; glycerol; diglycerol; and triethylene glycol;.

In embodiments, the solvent system comprises water, a 1,2-alcohol (e.g., 1,2-hexanediol, 1,4-butanediol, or both), a glycol (e.g., propylene glycol), and a glycerol.

In solvent systems comprising water and an organic solvent, the water to organic solvent weight ratio, as well as the type and relative amount of different organic solvents, may be selected to achieve certain properties for the aqueous inkjet ink composition such as a desired surface tension, viscosity, etc. In embodiments, the water to organic solvent weight ratio is from 90:10 to 51:49. If more than one organic solvent is used, these weight ratios refer to the total amount of organic solvent. As water may be present in the latex, colorant, etc., these weight ratios refer to the total amount of water.

Similarly, various total amounts of the solvent system may be used in the aqueous inkjet ink compositions. In embodiments, the solvent system is present in an amount of from 50 weight % to 95 weight %, from 60 weight % to 90 weight %, or from 65 weight % to 90 weight %. (Here, weight % refers to the (total weight of solvent system)/(total weight of aqueous inkjet ink composition)*100.) In embodiments, the total amount of water present is at least 50 weight %, at least 60 weight %, at least 70 weight %, at least 80 weight %, or in a range of from 50 weight % to 95 weight %. (Here, weight % refers to the (total weight of water)/(total weight of aqueous inkjet ink composition)*100.)

Colorant

The aqueous inkjet ink compositions comprise a colorant. As such, the aqueous inkjet ink compositions cannot be described as being clear or colorless. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include black pigments, cyan pigments, magenta pigments, and yellow pigments. Pigments can be organic or inorganic particles. Suitable inorganic pigments include carbon black. However, other inorganic pigments may be suitable such as cobalt blue ($CoO-Al_2O_3$), chrome yellow ($PbCrO_4$), iron oxide, and titanium dioxide ($TiO_2$). Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation). Other pigments include Kodak Specialty Dispersion pigments available from Kodak, Inc. These include Specialty Black Dispersion Type P2, Specialty Cyan Dispersion Type P2, Specialty Yellow Dispersion Type P2, Specialty Magenta Dispersion Type P3, Specialty Black Dispersion Type P4, Specialty Cyan Dispersion Type P1, Specialty Magenta Dispersion Type P1, and Specialty Yellow Dispersion Type P1. In embodiments, the colorant is not any of the quinacridone-based pigments disclosed in U.S. Pat. No. 9,359,522.

The above list of pigments includes unmodified pigment particulates, small molecule attached pigment particulates, self-dispersed pigment particulates, and polymer-dispersed pigment particulates.

In forming the aqueous inkjet ink compositions, the colorant(s) may be provided as a colorant dispersion comprising the colorant and a solvent (e.g., water). The colorant may be in the form of a particle and have an average particle size of from 20 nm to 500 nm, from 20 nm to 400 nm, or from 30 nm to 300 nm.

Various amounts of colorant may be used in the aqueous inkjet ink compositions. Generally, however, an amount is selected such that the total solids content (generally provided by the resin particles, the colorant, and if present, a wax) of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

A feature of at least embodiments of the aqueous inkjet ink compositions is that the resin particles are freely dispersed in the ink as opposed to being attached to, adsorbed on, or coated onto the colorant (e.g., pigment) of the ink. This may be confirmed by viscosity measurements. For example, the Examples below describe experiments showing that the viscosity of an illustrative aqueous inkjet ink composition remains unchanged over extended periods of time and at elevated temperatures. By "unchanged" it is meant within ±5% of an initial viscosity value. Similarly, this may be confirmed by measurements showing that the $D_{50}$ particle size remains unchanged over extended periods of time and at elevated temperatures (here, "unchanged" has a meaning analogous to unchanged viscosity).

Wax

The aqueous inkjet ink composition may comprise a wax. Illustrative waxes include paraffin waxes, polyethylene waxes, polypropylene waxes, microcrystalline waxes, polyolefin waxes, montan based ester waxes and carnauba waxes. Waxes having a melting point in a range of from 50° C. to 150° C. may be used. Nanoscale (e.g., diameter of 1000 nm or less, 500 nm or less, or 100 nm or less) wax emulsions based on carnauba wax and paraffin wax may be used. Waxes from Michelman may be used (e.g., Michem Lube 103DI, 124, 124P135, 156, 180, 182, 190, 270R, 368, 511, 693, 723, 743, 743P, and 985; and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer 2500, Aquacer 507, Aquacer 513, Aquacer 530, Aquacer 531, Aquacer532, Aquacer 535, Aquacer 537, Aquacer 539, and Aquacer 593. In embodiments, the wax is an anionic nanoscale wax emulsion such as Michem Lube 190.

Various amounts of wax may be used in the aqueous inkjet ink compositions. Generally, however, an amount is selected such that the total solids content of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

Surfactant

The aqueous inkjet ink compositions may comprise one or more surfactants. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-S-7, Tergitol™ 15-S-9, TMN-6, TMN-100x and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-761p, S-764p, Silsurf® A008, Siltec® C-408, BYK 345, 346, 347, 348 and 349, polyether siloxane copolymer TECO® Wet-260, 270 500, etc. Some amphoteric fluorinated surfactants can also be used such as alkyl betaine fluorosurfactant or alkyl amine oxide fluorosurfactant such as Chemguard S-500 and Chemguard 5-111. Other surfactants which may be used include Surfynol PSA 336, Surfynol SE-F, and Surfynol 107L.

Various amounts of surfactant may be used in the aqueous inkjet ink compositions. In embodiments, the surfactant is present in an amount in a range of from 0.01 weight % to 2 weight %. (Here, weight % refers to the (total weight of surfactant)/(total weight of aqueous inkjet ink composition) *100.) If more than one type of surfactant is used, these amounts refer to the total amount of surfactant.

Additives

Various additives may be used in the aqueous inkjet ink compositions to tune the properties thereof. Suitable additives include one or more of biocides; fungicides; stabilizers; pH controlling agents such as acids or bases, phosphate salts, carboxylates salts, sulfite salts, amine salts, buffer solutions; anti-foam agents; defoamers; and wetting agents. However, generally, no chelating agents (e.g., EDTA) are included.

Various amounts of the additives may be used in the aqueous inkjet ink compositions. In embodiments, the additives are present in an amount in a range of from 0.01 weight % to 5 weight %. (Here, weight % refers to the (total weight of additives)/(total weight of aqueous inkjet ink composition)*100.) If more than one type of additive is used, these amounts refer to the total amount of additives.

In embodiments, the aqueous inkjet ink compositions are free of (i.e., do not comprise) a chelating agent.

Aqueous inkjet ink compositions based on the present resin particles do not necessarily require the addition of an additive to further adjust viscosity. This can mean that the aqueous inkjet ink compositions may be free of (i.e., do not comprise) a water-soluble resin or emulsion, a water-borne binder, a polymeric dispersant, and combinations thereof. This includes the possible exclusion of any of the water-soluble resin or emulsions, water-borne binders, polymeric dispersants described below. However, it is understood that in some embodiments, such compounds may be included. Finally, it is noted that none of the terms water-soluble resin, water-soluble emulsion, water-borne binder, and polymeric dispersant encompass the present resin particles themselves. Illustrative water-soluble resins/emulsions are polyethylene glycol and polyvinylpyrrolidone.

Illustrative water-borne binders are Rhoplex I-1955, Rhoplex I-2426D, Rhoplex I-62, Rhoplex I-98, Rhoplex E-1691, available from Rhohm & Haas. Others include Lucidene 190, Lucidene 400, and Lucidene 243, available from DSM Corporation; NeoCryl A-1110, NeoCryl A-2092, NeoCryl A-639, NeoRad R-440, NeoRad R-441, NeoRez N-55 under the name 972, PVP K-15, PVP K-30, PVP K-60, PVP K-85, Ganex P-904LC, PVP/VA W-63 available from ISP. Other exemplary water-borne binders include those available from Johnson Polymers (BASF) such as Joncryl 537, Joncryl H538, Joncryl H538.

Illustrative polymeric dispersants are acrylic polymers such as styrene-acrylic copolymers and vinylpyrrolidone copolymers, urethane or polyurethane dispersions, and acrylic-urethane hybrid dispersions. More specific polymeric dispersants include those available from Johnson Polymers (BASF) such as Joncryl® 671, Joncryl® 683, Joncryl® 296, Joncryl® 690, Joncryl HPD 296, Joncryl HPD96-E, Joncryl LMV 7085, Joncryl 8082. Other dispersants include those described in EP Patent No. 2097265, which is incorporated by reference for purposes of the dispersants, and those described in U.S. Patent Application No. 2019284414, which is incorporated by reference for purposes of the dispersants.

Similarly, the aqueous inkjet ink compositions may be free of (i.e., do not comprise) a resin other than those provided by the resin of the present resin particles. A single type of resin may be used. Similarly, the aqueous inkjet ink composition itself is generally not curable and as such, is free of (i.e., does not comprise) an initiator. It is noted that any other exclusions referenced above with respect to the resin particles and latex may be applied to embodiments of the aqueous inkjet ink compositions.

In embodiments, an aqueous inkjet ink composition comprises (or consists of) a solvent system; resin particles; a colorant; and optionally, one or more of a wax and an additive. In embodiments, the ink composition comprises (or consists of) a solvent system; resin particles; a colorant; a wax; and optionally, an additive. In any of these embodiments, the additives may be selected from a stabilizer, a surfactant, an anti-foam agent, a defoamer, a wetting agent, and a biocide. In any of these embodiments, the components may be selected from any of the solvent systems, resin particles, colorants, waxes, and additives disclosed herein. In any of these embodiments, amounts of the components may be used as described above.

The aqueous inkjet ink compositions may be formed by combining the desired components at the desired amounts and mixing. An illustrative method comprises adding any of the disclosed latexes (or the resin particles) to a colorant dispersion to form a first mixture; and adding a second mixture comprising a solvent system and an additive(s) to the first mixture to form the aqueous inkjet ink composition. A third mixture comprising a wax may be added to the combined first and second mixtures. Mixing and/or heating may be used during the method. The aqueous inkjet ink composition may be filtered prior to use. Illustrative details are provided in the Examples, below.

Properties

The aqueous inkjet ink compositions may be characterized by various properties, including properties which indicate that the composition is capable of being used in an inkjet printing apparatus to form printed images. The aqueous inkjet ink compositions may be characterized by an initial viscosity (measured within a day of forming the ink, at 37° C., and over a frequency range of from 1 to 6.3 s$^{-1}$ or 40 to 400 s$^{-1}$). The initial viscosity may be in a range of from 1 to 15 cP, which includes from 2 to 10 cP and from 3 to 8 cP. Such values distinguish the aqueous inkjet ink composition from other compositions, e.g., paints, which have significantly higher initial viscosities, e.g., more than 50 cP.

The aqueous inkjet ink compositions may be characterized by their water fastness. Wet rub resistance, measured as described in the Examples below, provides a measure of water fastness. In embodiments, the aqueous inkjet ink composition exhibits a wet rub resistance of at least 10, 12, or 14 as measured using an about 4.5 ng drop of the ink or a wet rub resistance of at least 15, 17, or 19 as measured using an about 9 ng drop of the ink. These values may refer to water fastness on paper substrates. As demonstrated in the Examples below, illustrative aqueous inkjet ink compositions exhibit even greater water fastness on metal substrates, e.g., aluminum, including a wet rub resistance of at least 30 as measured using an about 9 ng drop of the ink.

The aqueous inkjet ink compositions may be characterized by their open-air stability. The time before gelation in the aqueous inkjet ink composition upon exposure to air is observed provides a measure of such stability. This time may be determined as described in the Examples, below. In embodiments, the time before gelation is greater than 3 hours, greater than 4 hours, or in a range of from 3 hours to 5 hours. As demonstrated in the Examples, the time before gelation was extended by about 100% for an illustrative aqueous inkjet ink composition as compared to comparative aqueous inkjet ink compositions comprising resin particles formed from monomers which did not include a phosphoric acid monomer.

The aqueous inkjet ink compositions may be characterized by their long-term stability. Comparing an initial viscosity of the aqueous inkjet ink compositions (measured within a day of forming the ink) to viscosity values of the inks after storage at an elevated temperature (e.g., 60° C.) for a period of time (e.g., 3, 7, or 14 days) provides a measure of such stability. As demonstrated in the Examples, illustrative aqueous inkjet ink compositions exhibit viscosity values (measured at 37° C. and over a frequency range of from 1 to 6.3 s$^{-1}$ or 40 to 400 s$^{-1}$) after storage at 60° C. for 14 days that are within ±5% of respective initial viscosity values.

The aqueous inkjet ink compositions may be used to form printed images. In embodiments, such a method comprises ejecting droplets of any of the disclosed aqueous inkjet ink compositions onto a substrate to form an image thereon. The image may be of any form, e.g., text, graphic, etc. Such a method may further comprise incorporating the ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording sheet and below that of the ink composition in the printing apparatus. An offset or indirect printing process is also disclosed in, for example, U.S. Pat. No. 5,389,958, the disclosure of which is totally incorporated herein by reference.

Any suitable substrate or recording sheet can be employed as the final recording sheet. It is a feature of at least embodiments of the aqueous inkjet ink compositions that they are printable on both paper and non-paper, e.g., metal substrates. Metal substrates include, e.g., aluminum, brass, stainless steel, and copper. The substrates having images printed thereon using the any of the disclosed aqueous inkjet ink compositions are also encompassed by the present disclosure.

EXAMPLES

The following Examples are being submitted to further define various species of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Examples 1-4

A reactive surfactant solution of 1.2 grams (Hitenol AR 1025 from Montello) and 35 grams deionized water was prepared by mixing in a glass reactor. The reaction was then purged with nitrogen for 30 minutes. The reactor was then continuously purged with nitrogen while being stirred at 250 rpm. The reactor was then heated to 75° C. and held there. Separately, 0.3 grams of ammonium persulfate (APS) initiator was dissolved in 5 grams of deionized water and added to the reactor.

Separately, a monomer emulsion was prepared in the following manner: styrene, butyl acrylate, methacrylic acid, phosphoric acid 2-hydroxyethyl methacrylate ester (PAM) (Examples 1,4), bis[2-(methacryloyloxy)ethyl] phosphate (B2MP) (Examples 2, 3, 4), Glycerol formal methacrylate (Glyfoma) (Example 3), 1-dodecanethiol (DDT), poly(ethylene glycol) diacrylate (PEGDA250) (Example 1), Hitenol AR 1025, and deionized water were mixed to form an emulsion. The amounts of these components used are shown in Table 1, below. The emulsified mixture was fed to the reactor slowly for 2 h and the reaction continued for 2 h. An additional 0.15 g of APS initiator was dissolved in deionized water and added to the reactor over 10 minutes and the reaction continued for an additional 1.5 hours. The resulting latex was cooled to room temperature and neutralized to pH 8.0 with either 30% aqueous solution of dimethylethanolamine (DMEA) or 5 M KOH solution to pH 5.0 and from pH 5 to 8 with 30% DMEA.

The latex formulations are shown in Table 1.

In replicate experiments, in order to carry out seeded microemulsion polymerization instead of seed-free, 5% of the monomer emulsion was fed to the reactor over 10 min, followed by the addition of APS in 10 min. The mixture was held at constant temperature for an additional 10 min and the remaining monomer emulsion was fed in to the reactor over 2 h. The subsequent steps were followed as described above for seed-free emulsion polymerization.

Example 5-7 (Comparative)

In these examples, the procedure of Examples 1-4 was repeated but using a different mixture of monomers as shown in Table 1. Specifically, no phosphoric acid monomer was used. Instead, hydrophilic monomers were used such as sodium 4-styrenesulfonate (4-NaSS) and in Example 5, hydroxyethyl acrylate (HEA). Colloidal silica was also used in Example 5. The latex formulations are shown in Table 1.

TABLE 1

Latex Formulations.

| Material (g) | Example 1 | Example 2 | Example 3 | Example 4 | Comparative Example 5 | Comparative Example 6 | Comparative Example 7 |
|---|---|---|---|---|---|---|---|
| Styrene | 24 | 24 | 22 | 22 | 28 | 23 | 24 |
| Butyl Acrylate | 11 | 11 | 12 | 12 | 7 | 11 | 12 |
| Methacrylic Acid | 3.5 | 3.8 | 3.5 | 3.6 | 3 | 3 | 3 |
| Reactive Surfactant | 1.9 | 1.9 | 1.9 | 1.9 | 1.8 | 1.8 | 1.9 |
| PAM | 1.5 | 0 | 0 | 1.6 | 0 | 0 | 0 |
| B2MP | 0 | 1.5 | 1.1 | 1.1 | 0 | 0 | 0 |
| Glyfoma | 0 | 0 | 1.7 | 0 | 0 | 2 | 0.5 |
| 4-NaSS | 0 | 0 | 0 | 0 | 1 | 1 | 0.5 |
| HEA | 0 | 0 | 0 | 0 | 1.25 | 0 | 0 |
| PEGDA 250 | 0.3 | 0 | 0 | 0 | 0.25 | 0.3 | 0.3 |
| DDT | 0.4 | 0.4 | 0.4 | 0.4 | 0.5 | 0.45 | 0.35 |
| Colloidal Silica | 0 | 0 | 0 | 0 | 0.75 | 0 | 0 |
| APS | 0.4 | 0.4 | 0.4 | 0.4 | 0.45 | 0.45 | 0.45 |
| Deionized water | 57 | 57 | 57 | 57 | 56 | 57 | 57 |
| Total | 100 | 100 | 100 | 100 | 100 | 100 | 100 |

Examples 8-15

Aqueous inkjet ink compositions were formed using the latexes of Examples 3 and 4 and Comparative Examples 5-7. Specifically, aqueous inkjet ink compositions Examples 8-11 were formed using the latex of Example 3 in CMYK colors. Aqueous inkjet ink compositions Comparative Examples 12-15 were formed using the latex of Comparative Example 5 in CMYK colors. An aqueous inkjet ink composition Example 16 was formed using the latex of Example 3 and a black pigment; this ink was used to print on both metal and paper substrates. An aqueous inkjet ink composition Example 17 was formed using the latex of Example 4 and a black pigment; this ink was used in the open-air stability study described below. Aqueous inkjet ink compositions Comparative Examples 18 and 19 were formed using the latex of Comparative Example 5 and black pigment dispersions; these inks also contain a chelating agent (EDTA). Aqueous inkjet ink compositions Comparative Examples 20 and 21 were formed using the latex of Comparative Examples 6 and 7, respectively and a black pigment; these inks were used in the open-air stability study described below. The following steps were used to form the aqueous inkjet ink compositions and the formulations are shown in Table 2:

1. The pigment dispersion was added to deionized water and mixed for about 15 minutes at a speed of about 650 RPM, using a Cowles blade impeller.
2. The latex was added slowly to the pigment dispersion and mixed for about 20 minutes (Mixture A).
3. In a separate beaker, the co-solvents and additives (humectant, stabilizer, defoamer/antifoam, surfactant, wetting agent, and adhesion promoter) were mixed to form a homogenous mixture (Mixture B).
4. Mixture B was slowly added into Mixture A. Once the addition was complete, the components were allowed to mix for another 20 minutes.
5. The wax was added and mixing continued for about another 15 minutes.
6. After mixing, the aqueous inkjet ink composition was left at room temperature for about 60 minutes before checking pH, conductivity and surface tension.

TABLE 2

Aqueous Inkjet Ink Compositions

| Component | Chemical | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|
| Solvent | Water | 25.5 | 8.8 | 22.5 | 20.6 | 24.5 | 8 | 20.9 | 18.5 | 20.3 | 20.9 | 14.5 | 12.5 | 20.1 | 20.0 |
| Pigment | C = cyan, M = magenta, Y = yellow, K = black | 31.5 (C) | 55 (M) | 36 (Y) | 36.5 (K) | 31.5 (C) | 55 (M) | 36 (Y) | 36.5 (K) | 33 (K) | 36.5 (K) | 36.5 (K) | 36.5 (K) | 36.5 (K) | 36.5 (K) |
| Latex | Latex of Example 3 (41.6%) | 8.9 | 7.5 | 7.7 | 8 | — | — | — | — | 14 | — | — | — | — | — |
| | Latex of Example 4 (39.5%) | — | — | — | — | — | — | — | — | — | 8.7 | — | — | — | — |
| | Latex of Comparative Example 5 (32.15%) | — | — | — | — | 11.4 | 9 | 9.5 | 10.2 | — | — | 10.2 | 10.2 | — | — |
| | Latex of Comparative Example 6 (38.3%) | — | — | — | — | — | — | — | — | — | — | — | — | 8.55 | — |
| | Latex of Comparative Example 7 (37.8%) | — | — | — | — | — | — | — | — | — | — | — | — | — | 8.7 |
| Defoamer/ Antifoam | BKY024/ FoamStar 2434 | 0.3 | — | 0.3 | 0.2 | 0.3 | — | 0.3 | 0.2 | 0.3 | 0.2 | 0.2 | 0.2 | 0.2 | 0.2 |
| Co-solvent 1 | Propylene glycol | 15 | 14.5 | 23 | 17.5 | 13.5 | 14.2 | 23 | 17.3 | 8.5 | 16 | 17.3 | 17.3 | 17.2 | 17.3 |
| Co-solvent 2 | 1,4-butanediol | 9 | — | 2 | 7.5 | 9 | — | 2 | 7 | 14 | 8 | 7 | 7 | 7 | 8 |
| Co-solvent 3 | 1,2-hexanediol | 4 | 8 | 2 | 4 | 4 | 7.6 | 2 | 5 | 4 | 4 | 5 | 5 | 5 | 4 |
| Humectant | Glycerol | 4 | 4 | 4 | 4 | 4 | 4 | 4 | 4 | 4 | 4 | 4 | 4 | 4 | 4 |
| Stabilizer | Monoethanolamine/ Triethanolamine | 0.06 | 0.15 | 0.05 | 0.05 | 0.05 | 0.13 | 0.05 | 0.05 | 0.1 | 0.05 | 0.05 | 0.05 | 0.2 | 0.05 |
| Wetting Agent | Multifunctional nonionic surfactant Surfynol AD01/ Hydropalat WE 3650 | 0.67 | 1 | 0.9 | 0.6 | 0.75 | 1 | 0.75 | 0.3 | 0.6 | 0.62 | 0.3 | 0.3 | 0.3 | 0.3 |
| Surfactant | Tego Tween 4000 | 0.03 | 0.03 | 0.03 | 0.03 | 0.03 | 0.03 | 0.03 | 0.03 | 0.01 | 0.03 | 0.03 | 0.03 | 0.03 | 0.03 |
| Adhesion Promoter | BYK4500 | — | — | — | — | — | — | — | — | — | 1.2 | — | — | — | — |
| Chelating Agent | Aqueous EDTA (0.5%) | — | — | — | — | — | — | — | — | — | — | — | 4 | 6 | — |
| Wax | Michem Lube 190 (35% solids) | 1 | 1 | 1.5 | 1 | 1 | 1 | 1.5 | 1 | — | 1 | 1 | 1 | 1 | 1 |
| Total % | | | | | | | | | 100 | | | | | | |

Print Testing

The aqueous inkjet ink compositions were jetted using a Dimatix DMP2800 printer on four different paper substrates, including, McCoy® gloss #100, SUW Matte, Xerox® Bold, and Kodak photo paper. A first set of test key parameters used were as follows: Drop mass=4.5-4.8 ng (i.e., about 4.5 ng), Drop velocity=6-7 m/s, frequency=5 kHz, voltage=16-20 V, printing temperature was 20° C. to 40° C. A second set of test key parameters used were as follows: Drop mass=8.5-9 ng (i.e., about 9 ng), Drop velocity=9-11 m/s, frequency=5 kHz, voltage=24-27 V, printing temperature was 20° C. to 40° C. The print parameter was a 600×600 dpi print. The measurement was done using a PIAS II instrument, which is a personal image analysis system with a digital loupe. The high-resolution optic module ~5 μm/pixel was used which has a field view of ~3.2 mm×2.4 mm to measure the dot size and diameter. Aqueous inkjet ink compositions which passed continuous jetting for >10-30 minutes were considered to exhibit good latency. The results are shown in Table 4 and discussed further below.

Metal Binding Testing of Latexes

An aqueous solution of $CaCl_2$ (10 mM) was prepared with deionized water. Aliquots of latexes from Examples 3 and 4 (1.25 g, neutralized with KOH+DMEA) were mixed with calcium chloride solution (8.75 g) to make 5% latex dispersion. The dispersions were mixed overnight at room temperature. The next day, the latex dispersions were washed with Amicon centrifuge filter units (100,000 molecular weight cut off (MWCO)) extensively to remove all non-bound calcium ions (at least 10 times, 30 min, 4000 rpm). The recovered samples were immersed in liquid nitrogen and freeze-dried overnight. This process formed fine powders without any sign of aggregation. The dried latex particles were then digested in a mixture of nitric and hydrofluoric acid and tested for Ca ions using Inductively Coupled Plasma (ICP). The results are discussed further below.

Open-Air Stability of Latexes

The stability of the aqueous inkjet ink compositions in open air was studied with the visual assessment of the onset of structure formation (gelling), the state of gelation, and fully gelled ink. For each study, 4 grams of test ink(s) along with a control ink were dispensed in identical Pyrex Petri dishes (60 mm d, 10 mm h) in the lab space (32% relative humidity, 22° C.) and inspected every 30 minutes for a total test duration of 5 hours. At each inspection interval, ink dishes were gently swirled to assess the severity of structure formation. Due to the variation in temperature, humidity, and air flow in the test environment, the weight of each sample was also measured. For each measurement, reported times for onset of gelation were corrected to 5.5 weight % evaporation per hour. The results are discussed further below.

Wet Rub Resistance (Water Fastness)

Aqueous inkjet ink compositions were tested for wet rub resistance (20 double-rubs using wet Q-tip) (water fastness). Drops (4.5 and 9 ng) of each aqueous inkjet ink composition were printed on the desired substrate. The numbers in Table 4 indicate the number of double-rubs (an average of 3 measurements) that were obtained before any removal of the ink was observed. The results are shown in Table 4 and discussed further below.

Results

The four paper substrates used for printing were studied using the Energy Dispersive X-ray (EDX) feature on an electron microscope. The results are shown in Table 3, demonstrating that all four substrates contain a high amount of metal (calcium and aluminum). The ICP results also showed that the latexes of Examples 1-4 showed strong chelation ability. For example, the latex of Example 4 showed ~4000 ppm calcium ion uptake while a control latex (the latex of Example 4 without calcium ion incubation) only showed 3 ppm of calcium uptake.

TABLE 3

Metal content of various paper substrates.

| Paper Substrate | C (%) | O (%) | Ca (%) | Al (%) |
|---|---|---|---|---|
| McCoy ® gloss #100 | 14.1 | 42.2 | 28.7 | 2.5 |
| SUW Matte | 11.7 | 44.5 | 20.4 | 6.7 |
| Xerox ® Bold | 31.1 | 51.9 | 5.9 | <1 |
| Kodak photo paper | 9.1 | 47.3 | <1 | 34.2 |

As shown in Table 4, aqueous inkjet ink compositions Examples 8-11 showed excellent jetting (no misdirectionality and satellites, jetted for >30 minutes), latency, and decap time. These also showed improved water fastness (both at about 4.5 ng and about 9 ng drop mass) and mechanical properties as compared to aqueous inkjet ink compositions Comparative Examples 12-15 and other commercial benchmark inks.

TABLE 4

Printing Performance and Water Fastness of Aqueous Inkjet Ink Compositions.

| | Example 8 | | | | Example 9 | | | |
|---|---|---|---|---|---|---|---|---|
| | McCoy Gloss | | SUW Matte | | McCoy Gloss | | SUW Matte | |
| Drop mass (ng) | 4.5 | 9 | 4.5 | 9 | 4.5 | 9 | 4.5 | 9 |
| Dot Diameter (μm) | 50.40 | 61.23 | 54.53 | 65.03 | 53.50 | 68.60 | 63.10 | 79.93 |
| Dot Circularity | 1.00 | 1.00 | 1.00 | 1.00 | 1.00 | 1.10 | 1.10 | 1.20 |
| Mottle | 0.30 | 0.17 | 0.33 | 0.20 | 0.50 | 0.37 | 0.47 | 0.37 |
| Graininess | 2.47 | 0.60 | 2.00 | 0.47 | 2.17 | 0.23 | 2.27 | 0.47 |
| Line Width (mm) | 0.046 | 0.060 | 0.050 | 0.064 | 0.046 | 0.067 | 0.060 | 0.079 |
| OD | 1.17 | 1.68 | 1.25 | 1.65 | 0.99 | 1.58 | 0.96 | 1.53 |
| L* | 58.79 | 48.16 | 57.01 | 48.51 | 57.37 | 47.74 | 57.64 | 47.94 |
| a* | −31.80 | −28.60 | −34.33 | −31.48 | 66.48 | 77.09 | 63.80 | 75.46 |
| b* | −50.81 | −58.65 | −48.55 | −55.83 | −13.13 | −3.42 | −11.43 | −2.73 |
| Water fastness (rub) | 14 | 19 | — | — | 12 | 16 | — | — |

TABLE 4-continued

Printing Performance and Water Fastness of Aqueous Inkjet Ink Compositions.

|  | Example 10 | | | | Example 11 | | | |
| --- | --- | --- | --- | --- | --- | --- | --- | --- |
|  | McCoy Gloss | | SUW Matte | | McCoy Gloss | | SUW Matte | |
| Drop mass (ng) | 4.5 | 9 | 4.5 | 9 | 4.5 | 9 | 4.5 | 9 |
| Dot Diameter (μm) | 52.07 | 64.03 | 53.57 | 68.70 | 58.13 | 70.00 | 63.20 | 79.87 |
| Dot Circularity | 1.00 | 1.00 | 1.10 | 1.07 | 1.00 | 1.00 | 1.10 | 1.10 |
| Mottle | 0.40 | 0.30 | 0.40 | 0.23 | 0.73 | 0.60 | 0.70 | 0.47 |
| Graininess | 2.47 | 0.70 | 2.13 | 1.20 | 2.63 | 0.40 | 2.37 | 0.90 |
| Line Width (mm) | 0.048 | 0.064 | 0.050 | 0.067 | 0.055 | 0.069 | 0.061 | 0.080 |
| OD | 0.88 | 1.13 | 0.88 | 1.09 | 1.15 | 1.66 | 1.08 | 1.56 |
| L* | 91.55 | 90.84 | 90.86 | 89.77 | 31.98 | 16.41 | 34.53 | 18.97 |
| a* | −7.58 | −5.45 | −7.83 | −5.67 | 1.40 | 0.81 | 1.37 | 0.66 |
| b* | 88.17 | 104.19 | 87.04 | 100.00 | 1.34 | −1.35 | 2.52 | −1.22 |
| Water fastness (rub) | 12 | 18 | — | — | 14 | 19 | — | — |

|  | Comparative Example 12 | | | | Comparative Example 13 | | | |
| --- | --- | --- | --- | --- | --- | --- | --- | --- |
|  | McCoy Gloss | | SUW Matte | | McCoy Gloss | | SUW Matte | |
| Drop mass | 4.5 | 9 | 4.5 | 9 | 4.5 | 9 | 4.5 | 9 |
| Dot Diameter (μm) | 53.33 | 63.37 | 60.67 | 74.33 | 62.13 | 68.63 | 67.70 | 75.30 |
| Dot Circularity | 1.00 | 1.00 | 1.20 | 1.20 | 1.00 | 1.00 | 1.20 | 1.20 |
| Mottle | 0.53 | 0.30 | 0.53 | 0.30 | 0.57 | 0.40 | 0.57 | 0.37 |
| Graininess | 3.70 | 1.60 | 2.87 | 1.50 | 2.10 | 1.10 | 1.73 | 1.27 |
| Line Width (mm) | 0.048 | 0.063 | 0.058 | 0.073 | 0.057 | 0.066 | 0.063 | 0.075 |
| OD | 1.03 | 1.55 | 1.04 | 1.53 | 1.03 | 1.42 | 1.01 | 1.34 |
| L* | 60.85 | 49.85 | 60.95 | 50.10 | 56.84 | 49.60 | 56.85 | 50.49 |
| a* | −28.70 | −28.61 | −31.80 | −30.95 | 67.91 | 75.09 | 65.40 | 72.84 |
| b* | −48.54 | −57.37 | −45.16 | −54.45 | −13.35 | −5.94 | −11.36 | −5.62 |
| Water fastness (rub) | 11 | 14 | — | — | 10 | 13 | — | — |

|  | Comparative Example 14 | | | | Comparative Example 15 | | | |
| --- | --- | --- | --- | --- | --- | --- | --- | --- |
|  | McCoy Gloss | | SUW Matte | | McCoy Gloss | | SUW Matte | |
| Drop mass | 4.5 | 9 | 4.5 | 9 | 4.5 | 9 | 4.5 | 9 |
| Dot Diameter (μm) | 53.90 | 63.63 | 57.33 | 73.87 | 57.43 | 68.33 | 63.80 | 79.50 |
| Dot Circularity | 1.00 | 1.00 | 1.00 | 1.10 | 1.00 | 1.00 | 1.10 | 1.10 |
| Mottle | 0.40 | 0.33 | 0.40 | 0.30 | 0.70 | 0.60 | 0.63 | 0.53 |
| Graininess | 3.00 | 0.80 | 1.97 | 1.00 | 3.57 | 0.73 | 2.17 | 0.77 |
| Line Width (mm) | 0.050 | 0.065 | 0.058 | 0.074 | 0.051 | 0.063 | 0.062 | 0.081 |
| OD | 0.87 | 1.11 | 0.86 | 1.11 | 1.09 | 1.58 | 1.12 | 1.45 |
| L* | 91.68 | 90.74 | 90.78 | 89.67 | 34.13 | 18.40 | 32.86 | 22.07 |
| a* | −7.68 | −5.57 | −8.33 | −6.10 | 1.36 | 0.68 | 1.34 | 0.60 |
| b* | 87.81 | 103.17 | 85.57 | 101.16 | 0.72 | −0.98 | 1.73 | −0.50 |
| Water fastness (rub) | 9 | 13 | — | — | 9 | 12 | — | — |

Notably, aqueous inkjet ink compositions Examples 11 and 17 showed substantially improved open-air stability as evidenced by extended flow time and delay in the onset of structure formation (gelling) under open-air conditions. Specifically, the onset of gelation for the comparative aqueous inkjet ink compositions Comparative Examples 15 and 20 exhibited an onset of gelation in the 2 to 2.5 hour time range, while those of Examples 11 and 17 exhibited an onset of gelation of greater than 4.5 hours. This is an almost 100% improvement.

Additional experiments were performed to assess redispersion properties and long-term stability of the aqueous inkjet ink compositions. Regarding redispersion properties, 20 μL of aqueous inkjet ink compositions Examples 8-11 and commercial inks were placed in Petri dishes and dried at room-temperature for 5 days. The ink co-solvent mixture (7 mL) was then gently added to each dish and the dishes were left undisturbed for 45 min. Visual assessment was used to evaluate redispersion by observing the extent of the spread of the colored inks in the co-solvent mixture. Aqueous inkjet ink compositions Examples 8-11 spread quickly, with noticeable dispersion at 15 minutes and nearly complete dispersion at 45 minutes. The commercial inks dispersed much more slowly. Their spread was about half that of aqueous inkjet ink compositions Examples 8-11 at 45 minutes. Finally, after rinsing with solvents, aqueous inkjet ink compositions Examples 8-11 did not leave any ring behind but the commercial inks left a drying ring for CMY colors.

Regarding long-term stability, aqueous inkjet ink compositions were subjected to accelerated aging tests at 60° C. At various time points as shown in Table 5, below, the viscosity of the aqueous inkjet ink compositions was measured at 37° C. and over two frequency ranges using an Ares G2 by TA instruments. The results show that the viscosity of the aqueous inkjet ink composition Example 11 is nearly unchanged after 14 days at 60° C. (within 3.8% and 2.9% of the initial viscosity values at the first and second frequency ranges, respectfully). These results also confirm that the resin particles of the latex, from which the aqueous inkjet ink composition Example 11 was formed, are freely dispersed throughout the ink and not adsorbed, attached, or coated onto the colorant in the composition. By contrast, aqueous inkjet ink compositions Comparative Examples 18 and 19 show severe instability.

TABLE 5

Rheological Stability of Aqueous Inkjet Ink Compositions

| Example | Day | Viscosity at T = 37° C. and from 1 to 6.3 $s^{-1}$ (% change from Day 0) | Viscosity at T = 37° C. and from 40 to 400 $s^{-1}$ (% change from Day 0) |
| --- | --- | --- | --- |
| Example 11 | 0 (initial viscosity value) | 3.70 | 3.84 |
| | Aged 3 days @ 60° C. | 3.72 (0.54%) | 3.84 (0%) |
| | Aged 7 days @ 60° C. | 3.69 (0.27%) | 3.78 (1.6%) |
| | Aged 14 days @ 60° C. | 3.84 (3.8%) | 3.95 (2.9%) |
| Comparative Example 18 | 0 (initial viscosity value) | 3.72 | 3.85 |
| | Aged 3 days @ 60° C. | 7.85 (110%) | 7.42 (93%) |
| Comparative Example 19 | 0 (initial viscosity value) | 3.45 | 3.83 |
| | Aged 3 days @ 60° C. | 10.87 (215%) | 7.59 (98%) |

Finally, printing tests were carried out to demonstrate that the aqueous inkjet ink compositions based on the latexes of Examples 1-4 were able to be printed on non-paper substrates, including metal substrates. For example, aqueous inkjet ink composition Example 8 was successfully printed on aluminum, brass, stainless steel and copper. Additional print testing was conducted by printing aqueous inkjet ink composition Example 16 on aluminum. Microscopic images of dots, lines, and solid block printed using this ink showed good spread. A dot diameter of 51 μm and a line width of 47 μm was obtained. In addition, the print on aluminum was exceptionally durable and resistant to both dry and wet rubs. The water fastness results using an about 9 ng drop size exceeded 30 double-rubs (virtually perceived infinite water fastness). By contrast, a commercial ink dissolved in the wet cotton swab within the first 3 double-rubs.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A latex comprising water and resin particles consisting of a polymerization product of reactants consisting of styrene; butyl acrylate; one or both of phosphoric acid 2-hydroxyethyl methacrylate ester and bis[2-(methacryloyloxy)ethyl] phosphate; methacrylic acid; an anionic ether sulfate reactive surfactant; a chain transfer agent; an initiator; and optionally, one or both of dioxane/dioxolane monomers and multifunctional monomers.

2. The latex of claim 1, wherein the latex does not comprise a colorant.

3. The latex of claim 1, wherein the latex does not comprise boric acid, diglycolic acid, a chelating agent, or combinations thereof.

* * * * *